April 2, 1968   J. B. CHAMBERS ET AL   3,376,077
PNEUMATIC CONVEYOR
Filed July 18, 1966   2 Sheets-Sheet 1
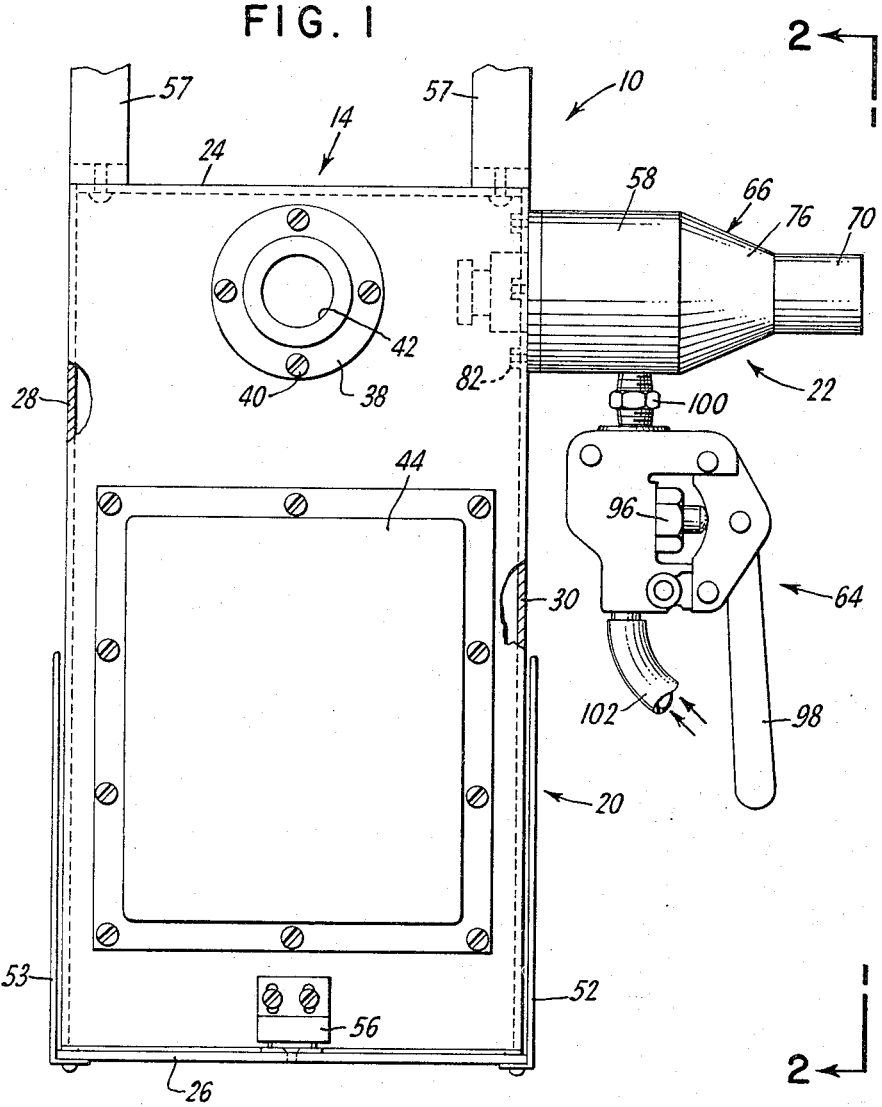
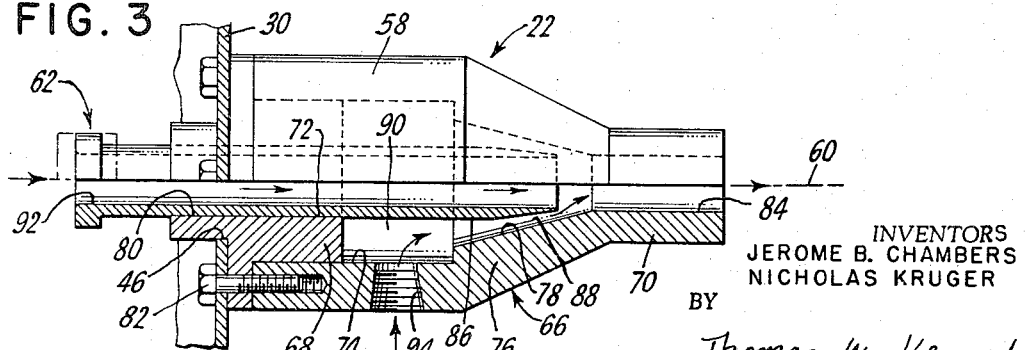
INVENTORS
JEROME B. CHAMBERS
NICHOLAS KRUGER
BY
Thomas W. Kennedy
ATTORNEY

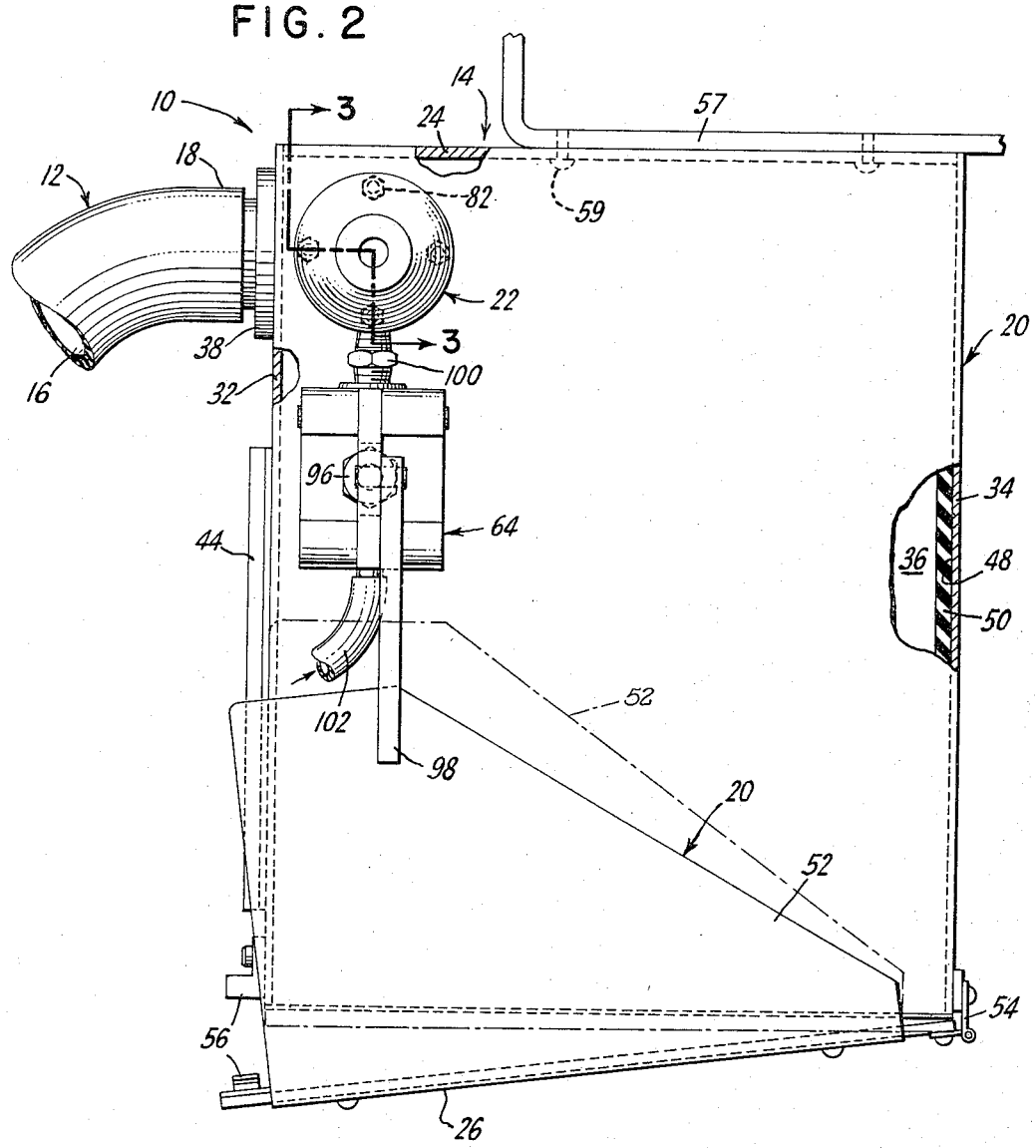

United States Patent Office

3,376,077
Patented Apr. 2, 1968

3,376,077
PNEUMATIC CONVEYOR
Jerome Barnaby Chambers, Billings, Mont., and Nicholas Kruger, New York, N.Y., assignors to American Machine & Foundry Company, a corporation of New Jersey
Filed July 18, 1966, Ser. No. 566,109
2 Claims. (Cl. 302—59)

ABSTRACT OF THE DISCLOSURE

A tube cleanout device comprising a collector housing with walls forming a chamber having an inlet opening for connection to a tube to be cleaned out and having an outlet opening: a gas evacuator having an inlet opening connecting to the housing outlet opening and having an outlet opening and having a gas inlet port; and a manual gas-injector valve connecting to the evacuator gas inlet port and supplied with compressed gas; in which said housing has a resilient member mounted on one of said wall portions within said chamber and arranged to face said chamber inlet opening, said wall portion and resilient member is disposed directly opposite said chamber inlet opening, and said resilient member has a substantially smooth inner surface.

---

The present invention relates to a pneumatic cigar-conveyor system, and particularly to a pneumatic cigar-conveyor system cleanout device.

A conventional pneumatic cigar-conveyor system includes a substantially airtight conveyor tube for conveying cigars therethrough having an upstream end and a discharge end, and a differential pressure means for providing a substantially constant differential air pressure between said discharge end and said upstream end for urging cigars through said tube at a desired design speed.

One problem with said conventional pneumatic cigar-conveyor system is that it is difficult to remove a cigar jam or blockage within the conveyor tube.

In accordance with one embodiment of the present invention, a cigar blockage can be removed and cleaned out by connecting a high-vacuum cleanout device to said tube discharge end.

Accordingly, it is one object of the invention to remove and to clean out a cigar blockage in a pneumatic cigar-conveyor system.

It is another object of the invention to provide a pneumatic cigar-conveyor system cleanout device, which removes a cigar blockage in a conveyor tube without depositing undesirable residue in said conveyor tube, and which minimizes the number of damaged cigars.

To the fulfillment of this and other objects, the invention provides a pneumatic cigar-conveyor cleanout device comprising a collector having a chamber with passage means for connection to a pneumatic cigar-conveyor tube at the discharge end thereof, and an evacuator with passage means connecting to said collector chamber for removing a cigar blockage in said tube using differential air pressure and for collecting cigars and debris from said tube.

Other objects of the invention will become apparent upon reading the following description and the accompanying drawings, wherein like parts are designated by like numerals throughout the several views; and wherein:

FIG. 1 is an elevation view of a pneumatic cigar-conveyor system embodying features of the present invention;

FIG. 2 is a sectional view on line 2—2 of FIG. 1; and

FIG. 3 is a sectional view on line 3—3 of FIG. 2.

Referring to FIG. 1, one embodiment of the present invention is a conveyor system 10. Conveyor system 10 includes a conveyor tube and a cleanout device 14.

Tube 12 has a passage 16, and has a discharge end portion 18, which is connected to cleanout 14. Cleanout 14 includes a collector housing 20 and an evacuator 22, which is connected thereto.

Housing 20 includes top and bottom wall plates 24, 26, sidewall plates 28, 30, and end wall plates 32, 34, which are joined together to form a pressurized collector chamber 36.

End wall 32 has a pipe flange 38, which is fixedly connected thereto by bolts 40, and which has a passage 42, that interconnects passage 16 and chamber 36. End wall 32 also has a transparent window 44 for inspecting chamber 36. Sidewall 30 has an opening 46 (FIG. 3), through which evacuator 22 extends for support by sidewall 30.

End wall 34 has an inner surface 48, which is covered by a resilient body 50 for absorbing the energy of impact of the cigars (not shown), which leave passage 16 at a high speed on entry to chamber 36. Bottom wall 26, which is a door, has side portions 52, 53, and hinges 54 and a latch 56 for ease of removing said cigars that are collected in chamber 36. Top wall 24 is supported by a bracket 57, and is connected thereto by bolts 59.

Evacuator 22 (FIG. 3) includes a hollow outer body 58 with a longitudinal axis 60, and a hollow pipe 62, which extends into outer body 58 coaxially therewith. Evacuator 22 also includes a high-pressure air injector means 64, which connects to outer body 58.

Outer body 58 has a peripheral wall 66 and a pair of axially-spaced end walls 68, 70. Peripheral wall 66 has a substantially cylindrical portion 72, which has a radially inner surface 74 that is disposed adjacent to wall 68; and has a substantially conical portion 76, which has a radially inner surface 78 that is disposed adjacent to wall 70.

End wall 68 has an opening 80, through which pipe 62 extends. Wall 68, peripheral wall 66 and sidewall 30 are joined by bolts 82 for support of evacuator 22 from sidewall 30. End wall 70 also has an opening 84, which is substantially coaxial with opening 80.

Pipe 62 has a radially outer surface 86, which sealingly engages opening 80 for ease of axial displacement and adjustment relative thereto. Pipe 62 forms an annular gap 88 between surface 86 and 78, which varies in size and thickness with said axial adjustment. Pipe 62 also forms an annular chamber 90 between surface 86 and both surfaces 74, 78. Pipe 62 also has an axial passage 92 extending therethrough.

Peripheral wall 66 has an inlet port 94, through which air is injected at a high pressure to chamber 90 thereby causing a low pressure zone adjacent to gap 88 for evacuating air from collector chamber 36 through pipe passage 92 and out through opening 84.

Injector 64 includes a spring-closed air valve 96, which has a hand lever 98. Valve 96 has an outlet nipple 100, which is threaded into port 94 for flow therefrom, and has a standard supply hose 102 for flow thereto.

In summary, this invention provides a pneumatic cigar-conveyor cleanout device, which removes cigars that form a blockage in the pneumatic cigar-conveyor system, by which cigars that block said conveyor can be removed without depositing undesirable residue in said conveyor, and by which the number of cigars that are damaged while removing a blockage is minimized.

While the present invention has been described in a preferred embodiment, it will be obvious to those skilled in the art that various modifications can be made therein within the scope of the invention. It is intended that the appended claims cover all such modifications.

What is claimed is:
1. A tube cleanout device comprising:
a collector housing with walls forming a chamber hav- ing an inlet opening for connection to a tube to be cleaned out and having an outlet opening;

a gas evacuator having an inlet opening connecting to the housing outlet opening and having an outlet opening and having a gas inlet port; and a manual gas-injector valve connecting to the evacuator gas inlet port and supplied with compressed gas; in which said housing has a resilient member mounted on a portion of one of said walls within said chamber and arranged to face said chamber inlet opening, said wall portion and resilient member is disposed directly opposite said chamber inlet opening, and said resilient member has a substantially smooth inner surface.

2. The cleanout device in claim 1, in which said housing walls include an end wall supporting said wall portion and resilient member and a bottom wall, which is hinged to said end wall, said bottom wall having a substantially flat inner surface which is disposed substantially at right angles to said inner surfaces of the resilient member.

References Cited

UNITED STATES PATENTS

| | | | |
|---|---|---|---|
| 488,446 | 12/1892 | Murray | 302—65 |
| 824,585 | 6/1906 | Rieth et al. | 302—23 |
| 2,653,438 | 9/1953 | Ramirez | 302—25 |
| 3,169,038 | 2/1965 | Pendleton | 302—59 |
| 3,175,515 | 3/1965 | Cheely | 302—25 |
| 3,186,768 | 6/1965 | Pendleton | 302—17 |

ANDRES H. NIELSEN, *Primary Examiner.*